(12) United States Patent
Chechik

(10) Patent No.: US 8,893,278 B1
(45) Date of Patent: Nov. 18, 2014

(54) DETECTING MALWARE COMMUNICATION ON AN INFECTED COMPUTING DEVICE

(75) Inventor: Daniel Chechik, Holon (IL)

(73) Assignee: Trustwave Holdings, Inc., Chicago, IL (US)

( * ) Notice: Subject to any disclaimer, the term of this patent is extended or adjusted under 35 U.S.C. 154(b) by 0 days.

(21) Appl. No.: 13/181,106

(22) Filed: Jul. 12, 2011

(51) Int. Cl.
G06F 11/00 (2006.01)
H04L 29/06 (2006.01)
G06F 21/56 (2013.01)

(52) U.S. Cl.
CPC .............. *H04L 63/145* (2013.01); *G06F 21/56* (2013.01); *G06F 21/566* (2013.01)
USPC ............................................ 726/24; 713/188

(58) Field of Classification Search
CPC ..... H04L 63/145; G06F 21/56; G06F 21/566; G06F 21/568
USPC ............................ 726/22, 23, 24, 25; 713/188
See application file for complete search history.

(56) References Cited

U.S. PATENT DOCUMENTS

| | | | |
|---|---|---|---|
| 6,092,194 A | 7/2000 | Touboul | |
| 6,154,844 A | 11/2000 | Touboul et al. | |
| 6,804,780 B1 | 10/2004 | Touboul | |
| 7,191,468 B2 | 3/2007 | Hanner | |
| 7,284,274 B1 | 10/2007 | Walls et al. | |
| 7,392,541 B2* | 6/2008 | Largman et al. | 726/17 |
| 7,472,284 B2 | 12/2008 | Shipp | |
| 7,613,926 B2 | 11/2009 | Edery et al. | |
| 7,624,449 B1 | 11/2009 | Perriot | |
| 7,647,633 B2 | 1/2010 | Edery et al. | |
| 7,849,509 B2 | 12/2010 | Venkatapathy et al. | |
| 7,975,305 B2* | 7/2011 | Rubin et al. | 726/25 |
| 8,079,086 B1 | 12/2011 | Edery et al. | |
| 8,117,531 B1 | 2/2012 | Lueck | |
| 8,181,246 B2* | 5/2012 | Shulman et al. | 726/22 |
| 8,225,408 B2 | 7/2012 | Rubin et al. | |
| 8,244,799 B1 | 8/2012 | Salusky et al. | |
| 8,341,724 B1* | 12/2012 | Burns et al. | 726/13 |

(Continued)

FOREIGN PATENT DOCUMENTS

| | | |
|---|---|---|
| CA | 2578792 | 3/2006 |
| EP | 0956094 | 12/1999 |

(Continued)

OTHER PUBLICATIONS

AdSafe, Making JavaScript Safe for Advertising, http://www.adsafe.org, retrieved Sep. 20, 2011, 4 pgs.

(Continued)

*Primary Examiner* — Samson Lemma
(74) *Attorney, Agent, or Firm* — Hanley, Flight & Zimmerman, LLC

(57) ABSTRACT

Rules describing attributes of malicious data requests, commonly generated by malware, are determined and stored. For example, a behavior server executes different types of malware and analyzes the data requests produced by the malware to identify attributes common to different malicious data requests. The rules describing malicious data request attributes are stored and subsequent data requests are compared to the stored rules to identify malicious data requests. If a data request has one or more attributes in common with attributes of malicious data requests, the data request is blocked. This allows attributes of a data request to be used to prevent malware executing on a client device from communicating with a malicious server.

30 Claims, 4 Drawing Sheets

(56) References Cited

U.S. PATENT DOCUMENTS

| | | | |
|---|---|---|---|
| 8,407,790 | B2 | 3/2013 | Mony |
| 2002/0095660 | A1 | 7/2002 | O'Brien et al. |
| 2003/0023873 | A1* | 1/2003 | Ben-Itzhak ............... 713/201 |
| 2003/0056199 | A1 | 3/2003 | Li et al. |
| 2003/0065926 | A1* | 4/2003 | Schultz et al. ............ 713/188 |
| 2003/0084063 | A1 | 5/2003 | DelMonaco et al. |
| 2004/0078784 | A1 | 4/2004 | Bates et al. |
| 2005/0108554 | A1 | 5/2005 | Rubin et al. |
| 2005/0138413 | A1 | 6/2005 | Lippmann et al. |
| 2005/0193380 | A1 | 9/2005 | Vitanov et al. |
| 2006/0095969 | A1* | 5/2006 | Portolani et al. ............. 726/23 |
| 2006/0161980 | A1 | 7/2006 | Huitema et al. |
| 2006/0190606 | A1 | 8/2006 | Kohavi |
| 2007/0113282 | A1 | 5/2007 | Ross |
| 2007/0143851 | A1 | 6/2007 | Nicodemus et al. |
| 2007/0250930 | A1 | 10/2007 | Aziz et al. |
| 2007/0277163 | A1 | 11/2007 | Avresky |
| 2008/0016339 | A1 | 1/2008 | Shukla |
| 2008/0046565 | A1* | 2/2008 | Liu ............................ 709/225 |
| 2008/0189086 | A1 | 8/2008 | Ford et al. |
| 2008/0216175 | A1 | 9/2008 | Pike |
| 2008/0263659 | A1 | 10/2008 | Alme |
| 2008/0301796 | A1 | 12/2008 | Holostov et al. |
| 2008/0320567 | A1* | 12/2008 | Shulman et al. ............... 726/4 |
| 2009/0019545 | A1 | 1/2009 | Ben-Itzhak et al. |
| 2009/0077091 | A1 | 3/2009 | Khen et al. |
| 2009/0282480 | A1 | 11/2009 | Lee et al. |
| 2009/0328210 | A1 | 12/2009 | Khachaturov et al. |
| 2010/0306537 | A1 | 12/2010 | Cohen |
| 2011/0083180 | A1 | 4/2011 | Mashevsky et al. |
| 2011/0093773 | A1 | 4/2011 | Yee |
| 2011/0179347 | A1 | 7/2011 | Proctor et al. |
| 2011/0282908 | A1 | 11/2011 | Fly et al. |
| 2011/0283356 | A1 | 11/2011 | Fly et al. |
| 2011/0289582 | A1 | 11/2011 | Kejriwal et al. |
| 2011/0307954 | A1 | 12/2011 | Melnik et al. |
| 2011/0307955 | A1* | 12/2011 | Kaplan et al. ................. 726/23 |
| 2011/0307956 | A1* | 12/2011 | Yermakov et al. ............ 726/24 |
| 2012/0117651 | A1 | 5/2012 | Edery et al. |
| 2012/0143650 | A1* | 6/2012 | Crowley et al. ............ 705/7.28 |
| 2012/0306537 | A1* | 12/2012 | Chou et al. .................... 326/81 |
| 2013/0081142 | A1 | 3/2013 | McDougal et al. |
| 2013/0097705 | A1 | 4/2013 | Montoro |

FOREIGN PATENT DOCUMENTS

| | | |
|---|---|---|
| EP | 1810152 | 7/2007 |
| WO | 9821683 | 5/1998 |
| WO | 9935583 | 7/1999 |
| WO | 2006025050 | 3/2006 |

OTHER PUBLICATIONS

Code Coverage Meter, http://www.coveragemeter.com/codecoverage.html, retrieved Feb. 13, 2012, 11 pgs.

Erickson, MashupOS: Can You Have Security and Web 2.0?, Dr. Dobb's Bloggers, Apr. 23, 2008, 4 pgs.

FBJS (Facebook JavaScript)—Facebook Developers, http://www.developers.facebook.com/docs/fbjs, retrieved Feb. 13, 2012, 17 pgs.

Google-caja, http://code.google.com/p/google-caja/, retrieved Sep. 20, 2011, 6 pgs.

Grune et al., Modern Compiler Design, First Edition, VU University Amsterdam, Amsterdam, The Netherlands, John Wiley & Sons, Ltd., 2000, ISBN 0471976970, 753 pgs. 2000 is earlier than the effective U.S. filed so that the particular month of publication is not in issue.

Hayhurst et al., A Practical Tutorial on Modified Condition/Decision Coverage, NSAS/TM-2001-210876, National Aeronautics and Space Administration, Langley Research Center, Hampton, VA, May 2001, 85 pgs.

Ho et al., Practical Taint-Based Protection using Demand Emulation, EuroSys 2006, pp. 29-41. 2006 is earlier than the effective U.S. filed so that the particular month of publication is not in issue.

Howell et al., MashupOS: Operating System Abstractions for Client Mashups, 2007, 7 pgs. 2007 is earlier than the effective U.S. filed so that the particular month of publication is not in issue.

International Search Report. International Application No. PCT/US2011/39869, Oct. 13, 2011, 2 pgs.

International Search Report, International Application No. PCT/US2011/39927, Sep. 29, 2011, 2 pgs.

International Search Report, International Application No. PCT/US2011/40040, Oct. 13, 2011, 2 pgs.

JavaScript the Definitive Guide, Chapter 20 JavaScript Security, 20.4 The Data-Tainting Security Model, docstore.mik.ua/orelly/web/jscript/ch20_04.html, retrieved Jan. 13, 2012, 5 pgs.

JSCoverage, Code Coverage for JavaScript, http://siliconforks.com/jscoverage/, retrieved Sep. 2, 2011, 2 pgs.

Livshits et al., Spectator: Detection and Containment of JavaScript Worms, 2008, 27 pgs. 2008 is earlier than the effective U.S. filed so that the particular month of publication is not in issue.

Microsoft-Research, Gatekeeper, http://research.microsoft.com/en-us/projects/gatekeeper/, retrieved Sep. 20, D 2011, 1 pg.

Microsoft-Research, Nozzle & Zozzle: JavaScript Malware Detection, http://research.microsoft.com/en-us/projects/Dnozzle/, retrieved Sep. 20, 2011, 2 pgs.

Microsoft WebSandbox Technology Preview, http://websandbox.livelabs.com/, retrieved Sep. 20, 2011, 6 pgs.

Nair et al., A Virtual Machine Based Information Flow Control System for Policy Enforcement, Department of Computer Science, Vrije Universiteit, Amsterdam, The Netherlands, Electronic Notes in Theoretical Computer Science 197, 2008, 14 pgs. 2008 is earlier than the effective U.S. filed so that the particular month of publication is not in issue.

JavaScript Security, Chapter 14 JavaScript Security, http:l/devedge-temp.mozilla.org/library/manuals/2000/javascript/1.3/guide/sec.html#1 021266, retrieved Sep. 20, 2011, 19 pgs.

Perlsec-perldoc.perl.org, retrieved Jan. 13, 2012, 11 pgs.

Reis et al., Usenix, BrowserShield: Vulnerability-Driven Filtering of Dynamic Html, OSDI '06 Paper, http://www.usenix.org/events/osdi06/tech/full_papers/reis/reis_html/index.html, retrieved Sep. 20, 2011, 24 pgs.

W3C, The World Wide Web Security FAQ, CGI (Server) Scripts, www.w3.org/Security/Faq/wwwsf4.htmi#CGI-Q15, retrieved Jan. 13, 2012, 17 pgs.

Wang et al., The Multi-Principal OS Construction of the Gazelle Web Browser, MSR Technical Report MSR-TR-2009-16, 2009, 20 pgs. 2009 is earlier than the effective U.S. filed so that the particular month of publication is not in issue.

\* cited by examiner

DETECTING MALWARE COMMUNICATION ON AN INFECTED COMPUTING DEVICE

BACKGROUND OF THE INVENTION

1. Field of the Invention

The present invention generally relates to malware detection and in particular to identifying communication originating from malware operating on a computing device.

2. Description of the Background Art

Computer networks and systems have become indispensable tools for modern data communication. Terabits of information are communicated by computer networks throughout the world. Much of this information is, to some degree, confidential and its protection is required. However, security threats have become increasingly able to evade conventional signature or pattern based detection techniques. In addition to viruses, additional types of malicious software ("malware"), such as zero-day attacks, denial of services, targeted threats, mass variant attacks and blended threats have become increasingly common methods for damaging computing systems and accessing data. One type of malware referred to as a "Trojan" is particularly difficult to prevent from harming a computing device.

A Trojan is a malicious program, or executable process, that is disguised as a benign program to avoid detection by conventional signature or pattern-based detection methods. Trojans typically include a payload that, when executed by a computing device impair the computing device's performance or communicate data from the computing device to a server without the knowledge or permission of the computer system's user. Further, it is increasingly common for a Trojan to disable, or trick, an anti-virus client or other security system executing on a computing device, rendering the security system on the computing device unable to remove or block the activity of the Trojan. This results in a Trojan executed by a computing device freely requesting data from a malicious server or transmitting data from the computing device.

Because conventional methods for detecting communication from a Trojan executing on a client device to a server rely on detection of patterns unique to the Trojan, conventional methods are unable to identify Trojan communication until a pattern or signature is associated with the Trojan. This allows newly-identified Trojans to communicate data without detection.

SUMMARY OF THE INVENTION

Embodiments of the present invention provide a system and method for identifying malicious data requests based on data request attributes. Initially, one or more rules identifying attributes associated with malicious data requests are determined. In one embodiment, a behavior server determines the rules identifying attributes associated with malicious data requests by executing malware and extracting attributes of the data requests generated by the executed malware. For example, a subset of attributes are extracted from data requests generated by multiple types of malware and used to generate rules identifying attributes of malicious data requests. A data request is received and attributes of the received data request are determined and compared to the rules identifying attributes associated with malicious data requests. Responsive to one or more attributes of the received data request matching one or more attributes associated with malicious data requests, data associated with the data request is blocked.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION

Figure 1:
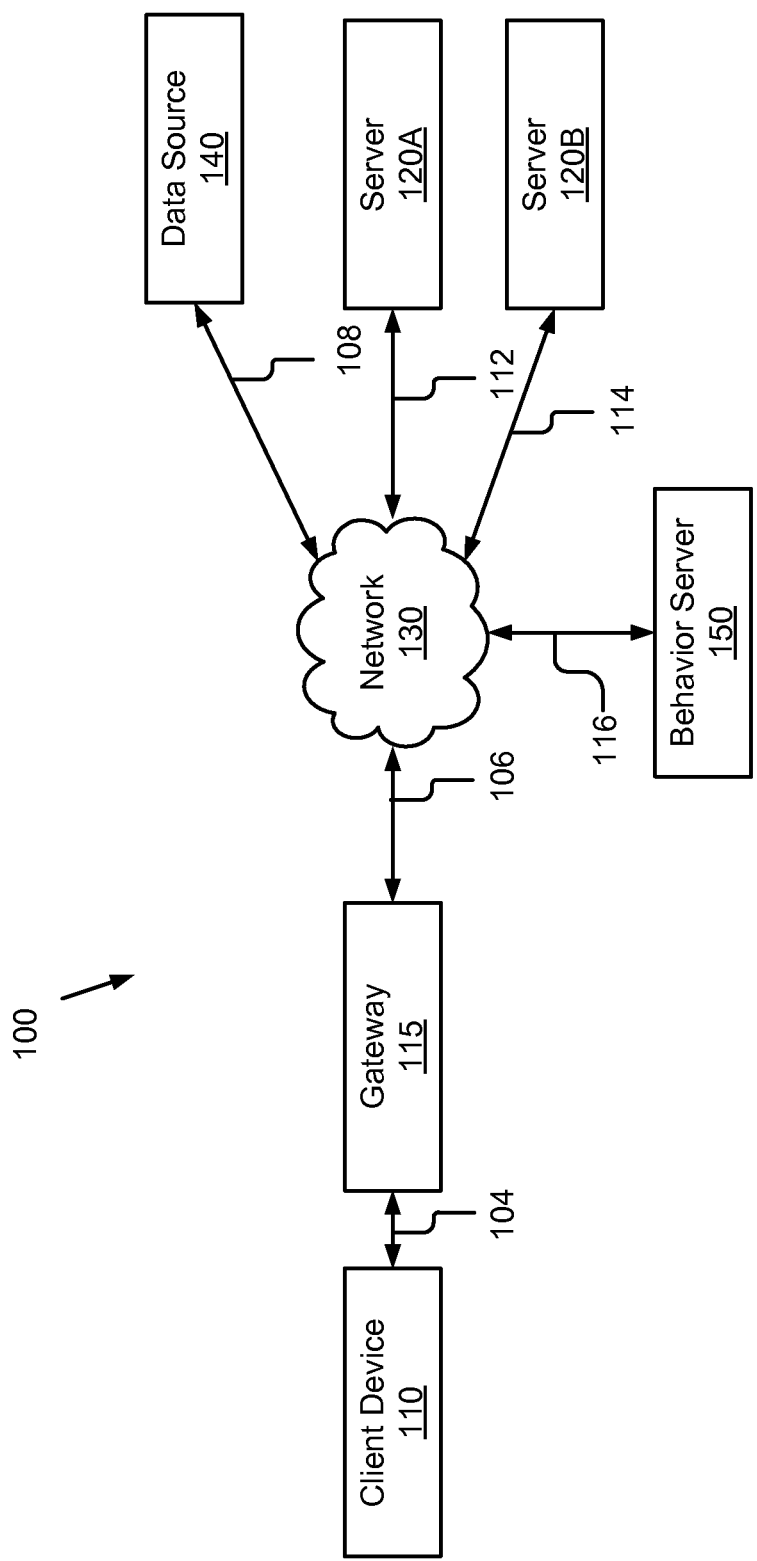
FIG. 1 is a block diagram of a system for detecting malicious data requests from a computing device in accordance with the present invention.

A method and system for determining whether a data request is malicious or is associated with malware is described below. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The invention can take the form of an entirely hardware embodiment, an entirely software embodiment or an embodiment containing both hardware and software elements. In one embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is described with reference to a particular programming language. It will be appreciated that a variety of programming languages may be used to implement the teachings of the invention as described herein.

System Overview

FIG. 1 is a diagram of a system 100 for identifying malicious data requests from a computing device. As used herein, the term "malicious data request" refers to a data request that is associated with malware or that otherwise seeks to impair performance of the computing device or transmit data from the computing device without authorization. In the embodiment of FIG. 1, the system 100 includes a client device 110, servers 120A, 120B and/or a data source 140 exchanging data with each other via a network 130. Additionally, in the embodiment shown by FIG. 1, the client device 110 is coupled to a gateway 115 via signal line 104, which is coupled to the network 130 via signal line 106. In one embodiment, the system 100 also includes a behavior server 150 coupled to the network 130. However, in other embodiments the system 100 includes additional and/or different components than the ones shown in FIG. 1.

The client device 110 is a computing device having data processing and communication capabilities. For example, a user device 110 comprises a desktop computer, a laptop computer, a netbook computer, a tablet computer, a smartphone or an internet capable television. While the system 100 shown by FIG. 1 includes a single client device 110, in other embodiments, the system 100 includes multiple client devices 110. For example, different types of client devices 110 are included in the system 100, such as a smartphone, a tablet computer and/or a laptop computer.

The client device 110 executes instructions or data using a processor to store, retrieve, modify or otherwise access data. When executing one or more processes, the client device 110 may access data from a remote source, such as a server 120 or another data source 140 via the network 130. To access remote data, the client device 110 transmits a data request to the server 120 or data source 140 via the network 130. The data request identifies the requested data as well as the client device 110 and may include additional information for identifying and retrieving the data.

A gateway 115 is coupled to the client device 110 and to the network 130 via signal line 106 and receives one or more data requests from the client device 110. The gateway 115 communicates the data request to a server 120 or a data source 140 via the network 130 and receives data from the server 120 or from the data source 140 via the network 130. The gateway 115 is a computing device that couples one or more client devices 110 to a network 130. For example, the gateway 115 is a router, a wireless access point, a network switch or any other suitable type of computing device. While FIG. 1 shows the gateway 115 as a separate component, in some embodiments the gateway 115 is included in the client device 110.

In addition to communicating data requests and data between a client device 110 and a server 120 or a data source 140, the gateway 115 also identifies malicious data requests from a client device 110. For example, the gateway 115 analyzes attributes of a data request from a client device 110 to determine whether the data request is malicious or benign. In one embodiment, the gateway 115 determines whether a data request is associated with a Trojan operating on a client device 110 based on attributes of the data request. A Trojan is a malicious process disguised as a benign process to enable its execution by the client device 110. Frequently, a Trojan executing on a client device 110 generates malicious data requests to obtain additional malware from a server 120 or data source 140 or generates malicious data requests to transmit data from the client device 110 to a server 120 or data source 140 via signal line 108.

In one embodiment, the gateway 115 analyzes a data request from a client device 110 and also analyzes data corresponding to the data request from a server 120 or a data source 140 to determine whether the data request is malicious. In another embodiment, the gateway 115 analyzes the data request from the client device 110 to determine whether the data request is malicious. For example, the gateway 115 analyzes one or more attributes of a data request and compares the one or more attributes to stored rules identifying attributes of malicious data requests previously generated by malware or associated with malicious behavior. In an embodiment, the gateway 115 applies the method further described below in conjunction with FIGS. 3 and 4 to identify malicious data requests.

The network 130 is a conventional network and may have any number of configurations such as a star configuration, a token ring configuration or another configuration known to those skilled in the art. In various embodiments, the network 130 is a wireless network, a wired network or a combination of a wireless and a wired network. Furthermore, the network 130 may be a local area network (LAN), a wide area network (WAN) (e.g., the Internet) and/or any other interconnected data path across which multiple devices may communicate. In yet another embodiment, the network 130 may be a peer-to-peer network.

The network 130 may also be coupled to, or include, portions of a telecommunications network for communicating data using a variety of different communication protocols. In yet another embodiment, the network 130 includes a Bluetooth communication network and/or a cellular communications network for sending and receiving data. For example, the network 130 transmits and/or receives data using one or more communication protocols such as short messaging service (SMS), multimedia messaging service (MMS), hypertext transfer protocol (HTTP), direct data connection, WAP, email or another suitable communication protocol.

A server 120 or a data source 140 is a computing device including data processing and communication capabilities. For purposes of illustration, FIG. 1 illustrates a system 100 including a first server 120A and a second server 120B; however, in other embodiments, the system 100 includes any number of servers 120. For example, a server 120 includes a processor, a communication unit and a storage device. However, in other embodiments, a server 120 may include different and/or additional components. A server 120a, 120b receives a data request from a client device 120 via signal line 112, 114 and transmits data to the client device 120 via the network 130. In one embodiment, a server 120 generates data or modifies data responsive to the data request. Different processes executed by the client device 110 may generate data requests for different servers 120. For example, a first process executed by the client device 110 generates a data request that is communicated to a first server 120A, while a second process executed by the client device 110 generates a data request that is communicated to a second server 120B.

Frequently, a malicious process executed by the client device 110, such as a Trojan or another form of malware, communicates with a server 120 to obtain additional malware or to transmit data from the client device 110 to the server 120. To prevent a malicious process from receiving data from a malicious server 120 or transmitting data to a malicious server 120, in one embodiment, the gateway 115 analyzes data requests from a client device 110 and blocks malicious data requests from communicating with a server 120 or blocks data received from a server 120 in response to a malicious data request from receiving the client device 110. Hence, the gateway 115 allows non-malicious data requests to be communicated to a server 120 via the network 130 while blocking malicious data requests to increase the security of the client device 110.

In one embodiment, the system 100 includes a behavior server 150 coupled to the gateway 115 and/or the client device 110 via the network 130. The behavior server 150 is a computing device having data processing and data communication capabilities that includes data describing malicious data requests or data requests associated with malware. In one embodiment, the behavior server 150 stores attributes of malicious data requests in a database. The database is communicated from the behavior server 150 to the gateway 115, which subsequently compares attributes of data requests from the client device 110 with the database to identify malicious data requests. Additionally, the behavior server 150 communicates with the gateway 115 or the client device 110 via the network 130 to update the database, allowing the gateway 115 to use the most current data for identifying malicious data requests. For example, the behavior server 150 transmits an updated database to the gateway 115 or to the client device 110 when additional attributes of data requests associated with malware are identified.

For example, the behavior server 150 executes malware in one or more virtual machines (often referred to as honeypots) and captures the data requests generated by the malware. The behavior server 150 then analyzes the data requests to identify one or more attributes of data requests produced by the executing malware. For example, the behavior server 150 identifies a user agent, a computer name, a Media Access Control Address, an Internet Protocol address, a Uniform Resource Indicator and/or a file name from the data requests generated by the malware and analyzes one or more of the attributes generated by different malware to determine characteristics of malicious data requests based on the different types of generated data requests. In one embodiment, the behavior server 150 generates one or more rules identifying attributes of malicious data requests based on analysis of the malicious data requests generated by multiple executing malware. Thus, the rules generated by the behavior server 150 specify attributes indicative of malicious data requests.

For example, the behavior server 150 analyzes the User Agent portion of data requests to identify User Agent portions commonly associated with malicious data requests. The User Agent portion of a data request is a text string that is sent from a client device 110 to a server 120 identifying the process or application generating the data request. For example, the header field for an unknown User Agent is suspicious. The unknown User Agent determination means that the user agent was not found in "browser User-Agent," "not browser User Agent" or "no User-Agent" groups.

In one embodiment, the behavior server 150 includes a blocking listing of User Agent data associated with malicious data requests, such as User Agent data used by different malware. This blocking listing is communicated to the gateway 115 and when the gateway 115 receives a data request including a User Agent portion matching an entry in the blocking listing, the data request is blocked. Alternatively, the behavior server 150 includes an authorized listing including User Agent data associated with legitimate processes. In one embodiment, the authorized listing is communicated to a gateway 115 to allow the gateway 115 to block a data request including a User Agent portion not included in the authorized listing. Alternatively, the behavior server 150 includes both a blocking listing and an authorized listing and communicates both the blocking listing and the authorized listing to a gateway 115. Additional examples of rules generated by the behavior server 150 and used by the gateway 115 to identify malicious data requests are further described below in conjunction with FIGS. 2-4.

In another example, the behavior server 150 analyzes communications to identify the computer name associated with the user's computer. A user defines the computer's name during installation or at another point. In some instances, malware uses the computer name as an indication of unique activities being performed by the user. As a result, the behavior server 150 notifies the gateway 115 that communications including the computer name are potentially suspicious.

In yet another embodiment, the behavior server 115 generates a rule identifying certain types of encrypted outgoing content as an attribute of malicious activity. For example, content that is encrypted with Base64 or hexadecimal is suspicious when it relates to internal system configurations, such as the IP address, a Media Access Control (MAC) address, a Windows folder, a user folder or a Windows process.

Figure 2:
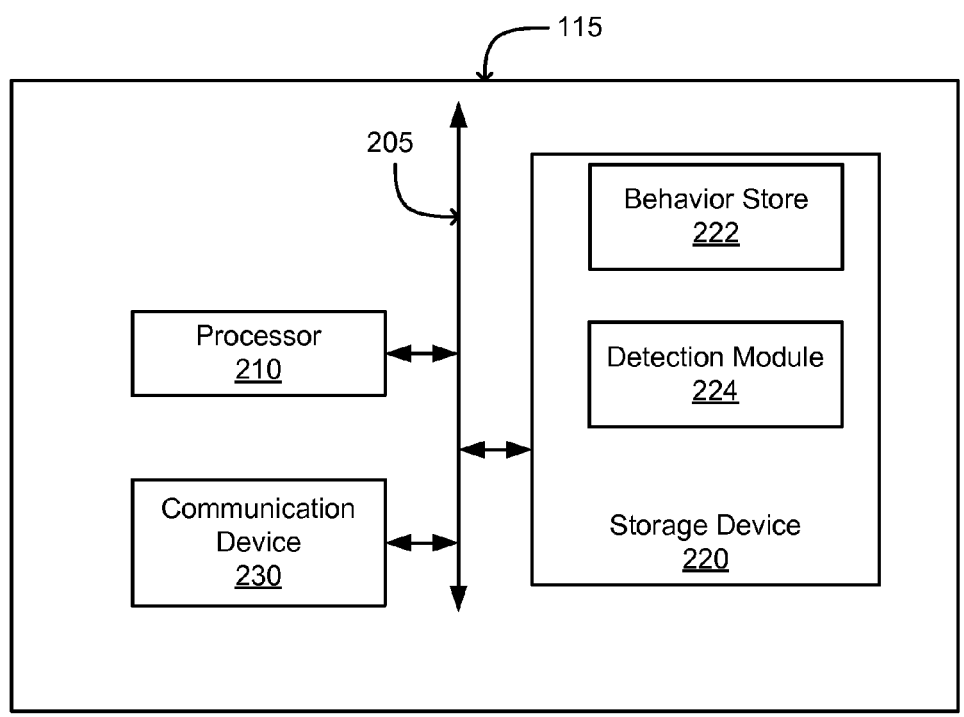
FIG. 2 is a block diagram of a gateway identifying malicious data requests in accordance with the present invention.

FIG. 2 is a block diagram of one embodiment of a gateway 115. In the embodiment shown by FIG. 2, the gateway 115 includes a processor 210, a storage device 220 and a communication unit 230 coupled to each other via a bus 205. However, in other embodiments the gateway 115 may include different and/or additional components than the ones shown by FIG. 2.

The processor 210 is an arithmetic logic unit, a microprocessor, a general purpose controller or some other processor array to perform computations or other data processing that is coupled to the bus 205 for communication with the other components of the gateway 115. The processor 210 processes data signals and may comprise various computing architectures including a complex instruction set computer (CISC) architecture, a reduced instruction set computer (RISC) architecture or an architecture implementing a combination of instruction sets. Although only a single processor 210 is shown in FIG. 2, in other embodiments the gateway 115 may include multiple processors.

The storage device 220 stores instructions and/or data that may be executed by processor 210. The stored instructions and/or data may be code for performing any and/or all of the functionality described herein. For example, the storage device 220 includes instructions that, when executed by the processor 210, cause the processor 210 to execute the steps further described below in conjunction with FIGS. 3 and 4. In one embodiment, the storage device 220 is a non-volatile memory device or similar persistent storage device and media. For example, the storage device 220 may be a hard disk drive, a floppy disk drive, a CD-ROM device, a DVD-ROM device, a DVD-RAM device, a DVD-RW device, a flash memory device or another mass storage device known in the art. In one embodiment, the storage device 220 comprises a dynamic random access memory (DRAM) device, a static random access memory (SRAM) device, flash memory or some other memory device known in the art. In another embodiment, the storage device 220 comprises a combination of persistent memory and non-persistent memory. The storage device 220 is coupled to the bus 205 to communicate with other components of the computing device.

In one embodiment, the storage device 220 includes a behavior store 222 and a detection module 224. The behavior store 222 includes one or more rules identifying attributes of malicious data requests. For example, the behavior store 222 includes a rule identifying data requests including a MAC in the uniform resource indicator (URI) as malicious, as most known processes do not include a MAC address in a data request. Similarly, the behavior store 222 includes a rule identifying data requests including an Internet Protocol (IP) address as malicious, as program languages such as JavaScript will not be able to extract the IP address from the user. As a result, data requests that include the IP address indicate that the malicious program is already installed on the user's client device 110. As another example, the behavior store 220 includes a listing of suspicious URIs for identifying malicious data requests based on a URI included in the data request. As yet another example, the behavior store 222 includes a listing of one or more file names associated with malware, so that data requests including a reference to a listed file name are identified as malicious.

The behavior store 222 also includes rules identifying attributes or properties of malicious data received from a server 120 or data source 140 in response to a data request. For example, the behavior store 222 associates types of responses from a server 120 or data source 140 with malicious data requests to aid in identification of malicious data requests. In one embodiment, if the server 120 or data source 140 returns less data than an amount of data associated with benign data requests, the behavior store 222 indicates that the data request prompting data transmission is malicious. Similarly, the behavior store 222 associates a data request prompting receipt of a fake error message from a server 120 as a malicious data request. Classifying data requests based on attributes of the received data as well as attributes of the corresponding data request allows the gateway 115 to more accurately identify malicious data requests.

The detection module 224 extracts attributes from a received data request and/or from received data and compares the extracted attributes to the contents of the behavior store 222. In one embodiment, the detection module 224 parses a data request into different attributes and compares at least a subset of the attributes to rules stored by the behavior store 222. In another embodiment, the detection module 224 extracts a subset of attributes of a data request and/or of received data and determines whether the subset of attributes are associated with malicious data requests based on the one or more rules stored in the behavior store 222. In yet another embodiment the detection module 224 also extracts a subset of the data received by the gateway responsive to a data request and compares the extracted subset of the received data to the content of the behavior store 222 to further determine whether the data request is malicious. The functionality of the behavior store 222 and the detection module 224 is further described below in conjunction with FIGS. 3 and 4.

In one embodiment, the behavior store 222 includes a series of rules that combine different types of attributes. Rule 1: The behavior store 222 includes a rule for blocking Trojans by medium or high file name and a request pattern. The detection module 224 blocks content where the header field includes an unknown or no user agent, the URL list includes a medium or high file name and request pattern and the content type is a web page.

Rule 2: The behavior store 222 includes a rule for blocking Trojans by response content size. The detection module 224 blocks content where the header field includes an unknown or no user agent, the detection module 224 detects low response content in the incoming direction with a content size less than or equal to ten characters, a response code of 200 and the content type is a web page. When the detection module 224 detects low response content, it is indicative of a server 120 that is offline or unavailable.

Rule 3: The behavior store 222 includes a rule for blocking Trojans that are trying to transmit encrypted client data such as the client's IP address, a MAC address, a Windows folder, a user folder or a process list with an unknown user agent. The detection module 224 blocks outgoing content (i.e. content that is being transmitted from the client device 110 to a data source 140 or server 120), the header field includes an unknown or no user agent and the identify string is encoded. For example, the content is hidden with Base64 encode or hexadecimal. In one embodiment, the detection module 224 adds a decode string and searches for a pattern in the output using regular expression.

Rule 4: The behavior store 222 includes a rule for blocking Trojans with medium or high file names and request patterns. The detection module 224 blocks content where the header field is a browser user agent; the URL list is a file name and medium or high request pattern; the detection module 224 detects low response content where the direction is incoming, the content size is less or equal to 100 characters and the response code is 200; and the content type is a web page.

Rule 5: The behavior store 222 includes a rule for blocking Trojans with medium or high file names and request patterns. The behavior store 222 blocks content where the header field is a browser user agent; the URL list is a file name and medium or high request pattern; and the detection module 224 detects low response content that includes incoming content with no response.

Rule 6: The behavior store 222 includes a rule for blocking Trojans by response content size with a browser user agent that contains suspicious data. The behavior store 222 blocks content when the header field is a browser user agent; outgoing content is encoded and includes an internal system configuration; the detection module 224 detects low response content that includes incoming content less than or equal to 100 characters and a 200 response code; and the content type is a web page. In one embodiment, the encoding is Base64 or hexadecimal and the internal system configuration includes an IP address, a MAC address, a Windows folder, a user folder or a process list. In one embodiment, the behavior store 222 adds to the prescanner or header fields an option to decode the string and search for a pattern in the output using a regular expression.

Rule 7: The behavior store 222 includes a rule for blocking Trojans that provide a MAC address and an unknown user agent. The behavior store 222 blocks content when the header field is a user agent that is unknown, none is provided or a browser; the a MAC address is shown in part of the URI; and the content type is a web page.

Rule 8: The behavior store 222 includes a rule for blocking Trojans with an executable size retrieve and an unknown user agent. The behavior store 222 blocks content when the header field is for unknown or no user agents; the detection module 224 detects small executable files with an incoming direction, a Windows executable content type, a content size not greater than 50 kb and a content size greater than 0 kb; and the content type is executable.

Rule 9: The behavior store 222 includes a rule for blocking Trojans with malicious user agents where the header field is a malicious user agent.

The communication unit 230 receives data requests from a client device 110 and transmits the data request to a server 120 or a data source 140 via the network 130. The communication unit 230 also receives data from the server 120 or from the data source 140 via the network 130 and communicates the data to the client device 110. The communication unit 230 is coupled to the bus 205. In one embodiment, the communication unit 230 includes a port for direct physical connection to the network or to another communication channel. For example, the communication unit 230 includes a USB, SD, CAT-5 or similar port for wired communication with the network. In another embodiment, the communication unit 230 includes a wireless transceiver for exchanging data with the network, or with another communication channel, using one or more wireless communication methods, such as IEEE 802.11, IEEE 802.16, BLUETOOTH® or another suitable wireless communication method.

In yet another embodiment, the communication unit 230 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 130 includes a wired port and a wireless transceiver. The communication unit 230 also provides other conventional connections to the network for distribution of files and/or media objects using standard network protocols such as TCP/IP, HTTP, HTTPS and SMTP as will be understood to those skilled in the art.

Methods

Figure 3:
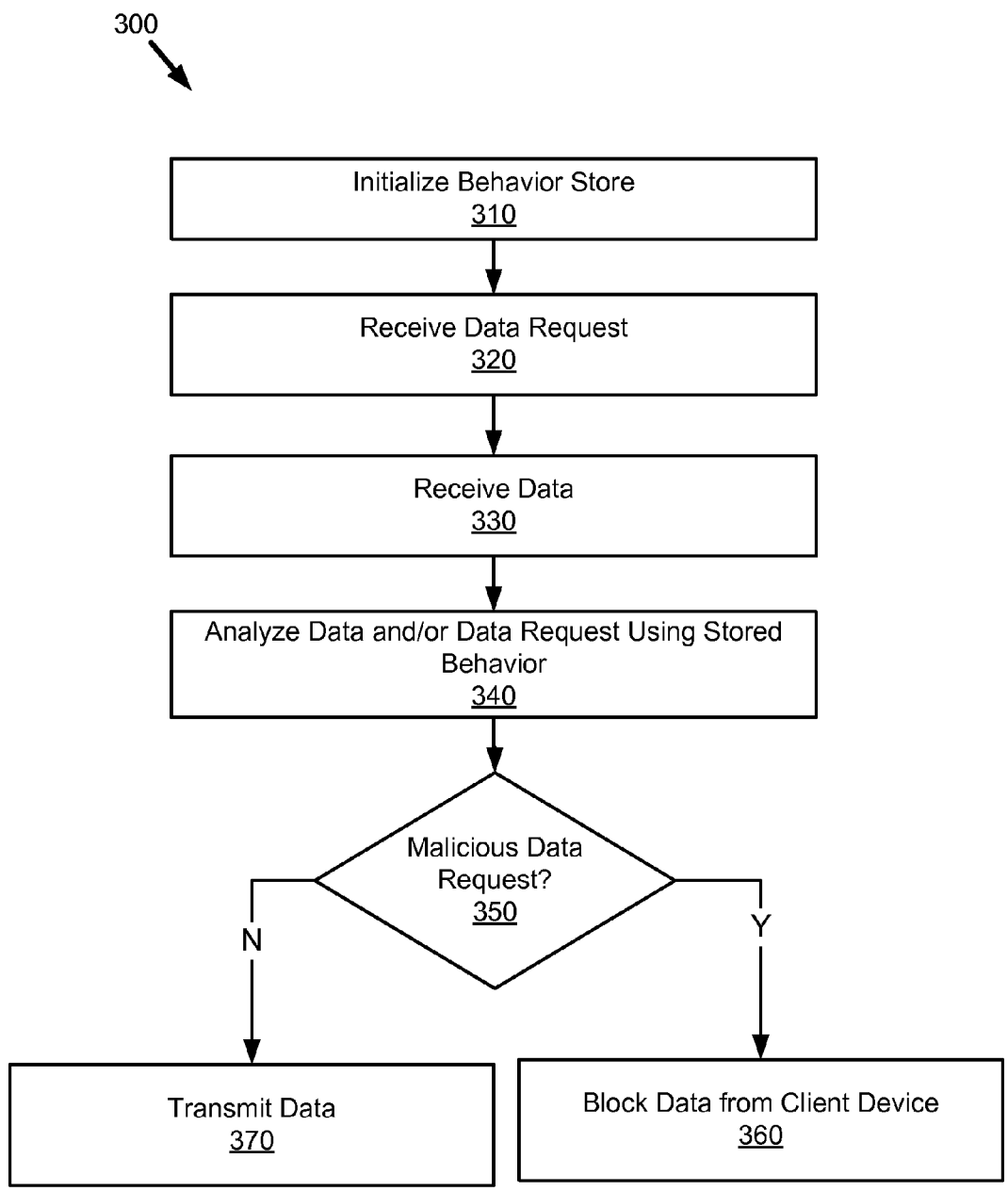
FIG. 3 is a flow chart of a method for determining whether a data request is malicious in accordance with the present invention.

FIG. 3 is a flow chart of a method 300 for determining whether a data request is malicious. In one embodiment, data is stored in the storage device 220 of the gateway 115, further described above in conjunction with FIG. 2, so that execution of the data by the processor 210 included in the gateway 115 causes execution of the functionality described below in conjunction with FIG. 3. Alternatively, data is stored in a storage device of a client device 110 so that execution of the data by a processor included in the client device 110 causes execution of the functionality described below in conjunction with FIG. 3.

Initially, the behavior store 222 of a gateway 115, or of a client device 110, is initialized 310 with rules associating attributes of a data request and/or attributes of received data with malicious data requests. In one embodiment, the behavior store 222 receives the rules for identifying a malicious data request from a behavior server 150 via the network 130. The behavior server 150 generates the rules by executing malware and analyzing the data requests generated by the executed malware to identify attributes of malicious data requests generated by the executing malware. These rules are then communicated from the behavior server 150 to a gateway 115 or a client device 110 to initialize 310 the behavior store 222.

After the behavior store 222 is initialized 310, a detection module 224 included in the gateway 115, or the client device 110, receives 320 a data request. If a gateway 115 includes the behavior store 222, the detection module 224 included in the gateway 115 receives 320 a data request from a client device 110 responsive to a process executed by the client device 110 requesting data or seeking to communicate with a server 120 or a data store 140. If a client device 110 includes the behavior store 222, the data request is received 320 by a detection module 224 included in the client device 110 responsive to a process executed by the client device 110 requesting data or seeking to communicate with a server 120 or a data source 140.

In one embodiment, the detection module 224 included in the gateway 115 or client device 110 then receives 330 data from a server 120 or from a data source 140 associated with the data request. For example, the detection module 224 receives 330 a hypertext transfer protocol (HTTP) response from a server 120 to the data request. As another example, the detection module 224 receives 330 a data response from a server 120 to the data request.

The detection module 224 then analyzes the data request and the corresponding data from the server 120 or from the data source 140 using the one or more rules stored in the behavior store 222. In one embodiment, the detection module 224 identifies one or more different attributes of the data request and/or attributes of the corresponding data and compares the one or more different attributes to the one or more rules included in the behavior store 222. For example, the detection module 224 parses the data request into its constituent attributes and/or the corresponding data into multiple attributes and compares a subset of the parsed attributes to one or more rules stored in the behavior store 222. Alternatively, the detection module 224 extracts specific attributes from the data request and/or from the data and compares the specific attributes to one or more rules included in the behavior store 222.

Based on the comparison between attributes from the data store and/or from the data and the rules in the behavior store 222, the detection module 224 determines 350 whether the data request is malicious. In one embodiment, the detection module 224 determines 350 that the data request is malicious if a predetermined number of attributes of the data request and/or its corresponding data are similar to, or match, rules included in the behavior store 222. Thus, one or more rules included in the behavior store 222 identify attributes of malicious data requests and if a data request and/or corresponding data has a specified number of attributes matching attributes associated with malicious data requests included in the behavior store 222 the data request is determined to be malicious. For example, if the data request includes a User Agent portion matching a User Agent portion included in a blocking list of the behavior store 222 and a file name associated with malware by the behavior store, the detection module 224 determines 350 that the data request is malicious.

Responsive to the detection module 224 determining 350 that the data request is malicious, the gateway 115 blocks 370 transmission of data corresponding to the malicious data request to the client device 110. If the detection module 224 is included in the client device 110, access to the received data is blocked 370 and the data is deleted from the client device 110. Hence, the method 300 prevents malware executing on a client device 110 from communicating with a server 120 to obtain additional malware or to communicate data from the client device 110 to a server 120. This prevents further harm to a client device 110 which has been infected with malware.

If the detection module 224 determines 350 that the data request is not malicious, the data associated with the data request is transmitted 370 from the detection module 224 to the client device 110. If the detection module 224 is included in a gateway 115, the data is transmitted 370 from the gateway 115 to the client device 110. If the detection module 224 is included in the client device 110, the data is transmitted 370 to the process associated with the data request for which the data was received. Hence, data requested by a data request that is not associated with malware or otherwise malicious is freely transmitted 370 to the client device 110.

Figure 4:
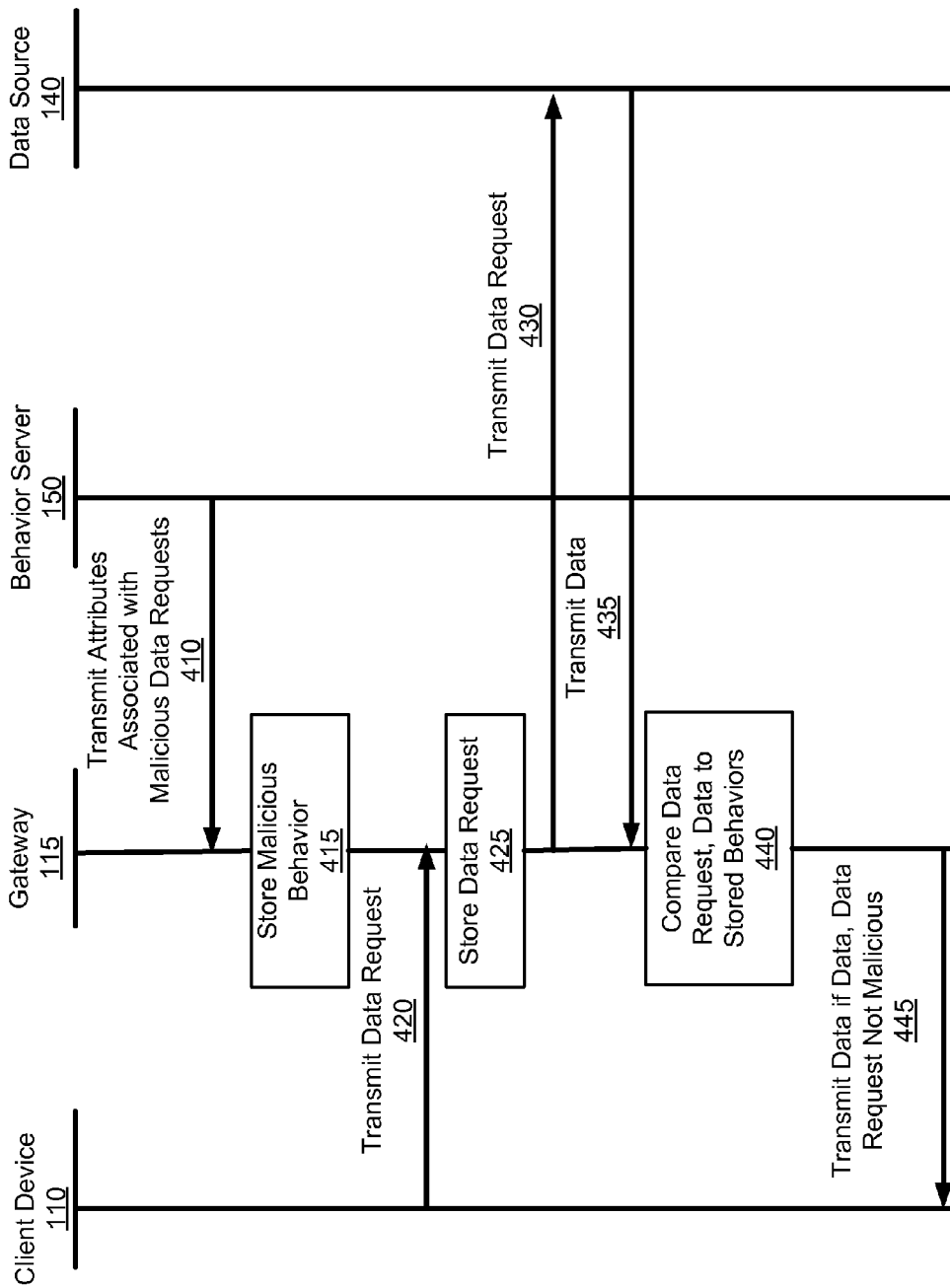
FIG. 4 is an event diagram of a method for determining whether a data request is malicious in accordance with the present invention.

FIG. 4 is an event diagram of a method 400 for determining whether a data request is malicious. For purposes of illustration, FIG. 4 shows an embodiment where the gateway 115 determines whether an data request is malicious. However, in other embodiments, a client device 110 may determine whether a data request is malicious.

Initially, a behavior server 150 transmits 410 behaviors associated with malicious data requests to the gateway 115, which stores 415 the received behaviors in a behavior store 222 of a gateway 115. In one embodiment, the behavior server 150 transmits one or more rules associating attributes of a malicious data request and/or attributes of data received responsive to a malicious data request. For example, the behavior server 150 identifies attributes of a User Agent, a computer name, a Media Access Control Address, a Uniform Resource Indicator and/or a file name from data requests generated by malware executed by the behavior server and transmits 410 the attributes to the gateway 115 via the network 130. In one embodiment, the behavior server 150 transmits 410 one or more rules associated with various attributes of malicious data requests and/or data received in response to a malicious data request.

For example, the behavior server 150 analyzes the User Agent portion of data requests to identify attributes of the User Agent portion common to malicious data requests. The User Agent portion of a data request is a text string that is sent from a client device 110 to a server 120 to identify the process or application that generates the data request. In one embodiment, the behavior server 150 includes a blocking listing of User Agent data associated with malicious data requests, such as User Agent data used by different malware. This blocking listing is transmitted 410 to the gateway 115. Alternatively, the behavior server 150 transmits 410 an authorized listing including User Agent data associated with legitimate processes to a gateway 115. In another embodiment, the behavior server 150 transmits 410 both a blocking listing and an authorized listing of User Agent data to the gateway 115.

In one embodiment, the behavior server 150 transmits a rule identifying data requests including a Media Access Control (MAC) as malicious, an Internet Protocol (IP) address as malicious and/or transmits a listing of suspicious uniform resource indicators (URIs) used by malicious data requests. As another example, the behavior server 150 transmits a listing of one or more file names used by malicious data requests to allow blocking of a data request including a reference to a listed file name.

In one embodiment, the behavior server 150 also transmits rules identifying attributes or properties of data received from a server 120 or data source 140 in response to a malicious data request. For example, the behavior server 150 transmits rules associating different types of responses from a server 120 or data source 140 with malware to aid in identification of malicious data requests. For example, the behavior server 150 transmits a rule identifying a malicious data request if a server 120 or data source 140 returns less than a specified amount of data in response to the data request. As another example, the behavior server 150 transmits a rule identifying a data request causing receipt of a fraudulent error message from a data source 140 as malicious.

After the behavior store 222 of the gateway 115 stores 415 the malicious behavior associated with malicious data requests, such as the rules indicating attributes of a malicious data request and/or data, the client device 110 transmits 420 a data request to the gateway 115. For example, a process executed by the client device 110 attempts to retrieve data from a data source 140 and transmits 420 a data request to the gateway 115. As another example, a process executed by the client device 110 attempts to communicate data from the client device 110 to a data source 140 and transmits 420 a data request including the data to be transmitted to the gateway 115. The gateway 115 stores 425 the data request in a detection module 224. For example, the gateway 115 stores 425 a copy of the data request in the detection module 224 to allow analysis of the data request by the detection module 224.

The gateway 115 then transmits 430 the data request to the data source 140 identified by the data request. In one embodiment, the gateway 115 transmits 430 a copy of the data request while storing 425 the originally-received data request. Alternatively, the gateway 115 transmits 420 the data request while storing 425 a copy of the data request in the detection module 224. Responsive to receiving the data request, or the copy of the data request, from the gateway 115, the data source 140 transmits 435 data to the gateway 115. After receiving data from the data source 140, the detection module 224 included in the gateway 115 compares 440 the data request and the data received responsive to the data request to the behaviors stored in the data store 222.

In one embodiment, the detection module 224 parses the stored data request into its constituent attributes and compares 440 the data request and/or the data from the data source 140 to behaviors stored in the behavior store 222. In one embodiment, if a specified number of attributes of the data request and/or the data from the data source 140 are similar to, or match, the stored behaviors associated with malicious data requests, the gateway 115 blocks the data from the data source 140 from being transmitted to the client device 110. Alternatively, if a specified percentage of attributes of the data request and/or the data from the data source 140 are similar to, or match, stored behaviors associated with malicious data requests, the gateway 115 blocks the data from the data source 140 from being transmitted to the client device 110. Alternatively, the detection module 224 extracts specific attributes from the data request and/or from the data store and compares the specific attributes to behaviors included in the behavior store 222.

In an alternative embodiment, different attributes of the data request and/or attributes of the data are weighted differently when compared to the behaviors stored in the behavior store 222. For example, a data request having a User Agent portion included in a blocking list stored by the behavior store 222 is determined to be malicious even if the data request does not include other malicious attributes. In another embodiment, a data request having a User Agent portion matching a User Agent included in an allowable list stored by the behavior store 222 is not classified as malicious, even if other attributes of the data request are similar to, or match, attributes of malicious data requests included in the behavior store 222. In yet another embodiment, even if a User Agent portion of a data request matches a User Agent included in an allowable list stored by the behavior store 222, the detection module 224 identifies the data request as malicious if data received from the data source 140 responsive to the data request, such as a server response, is less than a stored amount of data associated with benign data requests identified by the behavior store 222. Similarly, the detection module 224 may associate a data request causing receipt of a fraudulent error message identified by the behavior store 222 as malicious regardless of whether other attributes of the data request match malicious attributes identified by the behavior store 222. Thus, comparison 440 of the data request and/or the received data with stored behaviors may be modified for different implementations to customize determination of whether or not data requests are malicious.

If comparison 440 of the data request and/or data to the stored behaviors results in the data request not being determined to be malicious, the gateway 115 transmits 445 the data from the data source 140 and stored by the detection module 224 to the client device 110. Hence, the gateway 115 prevents malware, or other malicious processes, executing on the client device 110 from obtaining additional malware or transmitting data from the client device 110 to a data source 140 while allowing benign processes executing on the client device 110 to receive data from a data source 140. By using generalized behaviors associated with malware to block 445 data from a data source, the gateway 115 beneficially uses behaviors common to many types of malware rather than patterns specific to individual malware. This beneficially allows identification of data requests associated with malware without depending on frequent updates including signatures associated with specific malware.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A gateway to couple a client device to a data source, the gateway comprising:
   a behavior store including a rule identifying attributes associated with malicious data requests, the attributes including a User Agent field; and
   a detection module to, upon receipt of a response to a data request previously received by the gateway, determine whether the data request is a malicious request by comparing a request attribute of the data request to the attributes associated with the malicious data requests, the detection module to, responsive to the identification of the malicious request, prevent transmission of the response to the malicious request, at least one of the behavior store and the detection module is implemented by hardware.

2. The gateway of claim 1, wherein the gateway is to transmit the data request to the data source and the detection module is to compare a response attribute of the response with stored attributes to determine whether the data request is the malicious request.

3. The gateway of claim 2, wherein the gateway is to block data corresponding to the data request from the data source responsive to (a) the comparison of the request attribute to the attributes associated with the malicious data requests, and (b) a comparison of attributes of data received from the data source responsive to the data request to attributes of data received in response to the malicious data request.

4. The gateway of claim 1, wherein the gateway is to compare the request attribute to the attributes associated with the malicious data requests by parsing the data request into parsed attributes and comparing the parsed attributes with respective ones of the attributes associated with the malicious data requests.

5. The gateway of claim 1, wherein the request attribute further comprises at least one of: a Media Access Control (MAC) address, an Internet Protocol (IP) address, a computer name, a uniform resource indicator (URI), a uniform resource locator (URL), or a file name.

6. The gateway of claim 1, wherein the detection module is to identify the data request as malicious when the User Agent field is blank.

7. The gateway of claim 1, wherein the detection module is to identify the data request as malicious when a content size of the response is below a first threshold.

8. The gateway of claim 1, wherein the detection module is to identify the data request as malicious when the data request includes a payload that is encrypted and includes system configuration information.

9. The gateway of claim 1, wherein the detection module is to identify the data request as malicious when a response code of the response is 200, and a content type of the response is a web page.

10. The gateway of claim 1, wherein the detection module is to identify the data request as malicious based on an analysis of the response to the data request.

11. The gateway of claim 1, wherein the detection module is to identify the data request as malicious when (1) the data request includes a payload that is encrypted, (2) the data request includes system configuration information, and (3) a content size of the response is below a content size threshold.

12. The gateway of claim 1, wherein the detection module is to identify the data request as malicious when a uniform resource indicator (URI) of the request includes a media access control address.

13. The gateway of claim 1, wherein the detection module is to identify the data request as malicious when a payload of the response is an executable, and a content size of the executable is less than a threshold file size.

14. A method for identifying malicious data requests, the method comprising:
upon receipt of a response to a forwarded data request:
identifying attributes of the data request, the attributes of the data request including a User Agent;
determining, with a processor, whether the data request is malicious by comparing the attributes of the data request to a rule identifying attributes associated with malicious data requests, the processor to identify the data request as malicious when a User Agent field includes at least one of a blank user agent, an unknown user agent, or a browser user agent; and
responsive to determining the data request is malicious, blocking transmission of the response.

15. The method of claim 14, wherein the attributes of the data request further comprise at least one of a Media Access Control (MAC) address, an Internet Protocol (IP) address, a uniform resource indicator (URI), a uniform resource locator (URL), or a file name.

16. The method of claim 15, wherein determining whether the data request is malicious comprises determining that the data request is malicious when the User Agent field of the data request matches a user agent associated with a malicious data request.

17. The method of claim 15, wherein determining whether the data request is malicious comprises determining that the data request is malicious when a file name attribute of the data request matches a file name associated with a malicious data request.

18. The method of claim 15, wherein determining whether the data request is malicious comprises determining that the data request is malicious when a uniform resource indicator (URI) of the data request includes a media access control address.

19. The method of claim 14, further comprising, upon receipt of the response, analyzing the response to the data request.

20. The method of claim 14, further comprising comparing attributes of the data received from the data source responsive to the data request with attributes of data received in response to a malicious data request.

21. The method of claim 14, wherein determining whether the data request is malicious comprises determining that the data request is malicious when a length of the response is below a threshold length.

22. The method of claim 14, wherein determining whether the data request is malicious comprises determining that the request is malicious when the User Agent field is blank.

23. The method of claim 14, wherein determining whether the data request is malicious comprises determining that the data request is malicious when a content size of the response is below a threshold length, a response code of the response is 200, and a content type of the response is a web page.

24. The method of claim 14, wherein determining whether the data request is malicious comprises determining that the request is malicious when the data request includes a payload that is encrypted and includes system configuration information.

25. The method of claim 14, wherein determining whether the data request is malicious comprises determining that the data request is malicious when:
the User Agent field is a browser user agent;
a uniform resource locator of the request includes a file name;
a response code of the response is 200;
a content size of the response is less than a threshold; and
a content type of the response is a web page.

26. The method of claim 14, wherein determining whether the data request is malicious comprises determining that the data request is malicious when:
the User Agent field is a browser user agent;
a uniform resource locator of the data request includes a file name; and
no response is received responsive to the data request.

27. The method of claim 14, wherein determining whether the data request is malicious comprises determining that the data request is malicious when:
the User Agent field is a browser user agent;
the request includes a payload that is encoded;
the request includes an internal system configuration;
a response code of the response is 200;
a content size of the response is less than a content size threshold; and
a content type of the response is a web page.

28. The method of claim 14, wherein determining whether the data request is malicious comprises determining that the data request is malicious when:

a uniform resource identifier of the data request includes a Media Access Control (MAC) address; and a content type of the request is a web page.

29. The method of claim 14, wherein determining whether the data request is malicious comprises determining that the data request is malicious when a payload of the response is an executable, and a content size of the executable is less than a threshold file size.

30. A tangible computer-readable storage disc or storage device comprising instructions which, when executed, cause a machine to at least:

identify attributes of a received data request, the identified attributes including a User Agent field;

determine whether the data request is malicious by comparing the attributes of the received data request to a rule identifying attributes associated with malicious data requests, the received data request identified as malicious when (1) the User Agent field includes at least one of a blank user agent, an unknown user agent, or a browser user agent, and (2) the received data request includes a payload that is encrypted and includes system configuration information; and responsive to determining the received data request is malicious, block transmission of the response message.

* * * * *